United States Patent
Woo et al.

(10) Patent No.: US 12,210,760 B2
(45) Date of Patent: Jan. 28, 2025

(54) OBJECT STORAGE SYSTEM, MIGRATION CONTROL DEVICE, AND MIGRATION CONTROL METHOD

(71) Applicant: Samsung Electronics Co., Ltd., Suwon-si (KR)

(72) Inventors: Honguk Woo, Suwon-si (KR); Seunghwan Jeong, Suwon-si (KR); Jooyoung Park, Suwon-si (KR); Youngseok Lee, Suwon-si (KR)

(73) Assignees: Samsung Electronics Co., Ltd., Gyeonggi-do (KR); Research & Business Foundation Sungkyunkwan University, Suwon-si (KR)

( * ) Notice: Subject to any disclaimer, the term of this patent is extended or adjusted under 35 U.S.C. 154(b) by 118 days.

(21) Appl. No.: 17/983,892

(22) Filed: Nov. 9, 2022

(65) Prior Publication Data
US 2023/0176762 A1    Jun. 8, 2023

(30) Foreign Application Priority Data

Dec. 3, 2021  (KR) .................. 10-2021-0172378
Jun. 8, 2022  (KR) .................. 10-2022-0069699

(51) Int. Cl.
*G06F 3/06*  (2006.01)
*G06N 5/04*  (2023.01)

(52) U.S. Cl.
CPC .......... *G06F 3/0647* (2013.01); *G06F 3/0613* (2013.01); *G06F 3/0673* (2013.01); *G06N 5/04* (2013.01)

(58) Field of Classification Search
CPC ...... G06F 3/0647; G06F 3/0613; G06F 3/067; G06F 3/0673; G06F 3/0683; G06N 3/02;
(Continued)

(56) References Cited

U.S. PATENT DOCUMENTS 9,201,751 B1 * 12/2015 Muthirisavenugopal ................... G06F 16/185
10,237,201 B2   3/2019 Kelly
(Continued)

FOREIGN PATENT DOCUMENTS

JP    2019-125322 A    7/2019

OTHER PUBLICATIONS

Cano, I., Srinivas A., Varun A., Manosiz B., Akhilesh C., Chern C., Brent C., Karan G., Vinayak K., and A. Krishnamurthy. "Curator:{Self-Managing} Storage for Enterprise Clusters." In 14th USENIX Symposium on Networked Systems Design and Implementation (NSDI 17), pp. 51-66. 2017.*

(Continued)

*Primary Examiner* — Tracy A Warren
(74) *Attorney, Agent, or Firm* — Harness, Dickey & Pierce, P.L.C.

(57) ABSTRACT

An object storage system, a migration control device, and a migration control method are provided. The migration control method includes observing a plurality of total target input/output (I/O) throughputs, inferring a plurality of reference I/O throughputs by using a first neural network, observing a plurality of target I/O throughputs with respect to an i-th storage device, determining a target object to be migrated and a target storage device, in which the target object will be stored, by using a second neural network, and generating a command instructing to migrate the target object to the target storage device.

20 Claims, 12 Drawing Sheets

(58) Field of Classification Search
CPC ...... G06N 3/045; G06N 3/0455; G06N 3/092; G06N 3/08; G06N 5/04
See application file for complete search history.

(56) References Cited

U.S. PATENT DOCUMENTS

| | | | |
|---|---|---|---|
| 10,572,454 | B2 | 2/2020 | Ouyang |
| 10,795,583 | B2 | 10/2020 | Yang et al. |
| 10,860,236 | B2 | 12/2020 | Krasner et al. |
| 11,714,573 | B1* | 8/2023 | Bhardwaj ............ G06F 3/0614 711/154 |
| 2018/0246659 | A1 | 8/2018 | Agarwal et al. |
| 2019/0265915 | A1 | 8/2019 | Greenwood et al. |
| 2020/0057558 | A1* | 2/2020 | Beloussov ............ G06F 3/0634 |
| 2020/0073554 | A1 | 3/2020 | Doster et al. |
| 2020/0348875 | A1* | 11/2020 | Krasner ................ G06F 3/0659 |
| 2021/0240368 | A1* | 8/2021 | Thakkar ................ G06F 3/067 |
| 2021/0241131 | A1* | 8/2021 | Khawas ................ G06N 3/08 |
| 2021/0272012 | A1* | 9/2021 | Osaki ................ G06F 9/45558 |
| 2022/0413723 | A1* | 12/2022 | Thakkar ................ G06F 3/061 |
| 2023/0036528 | A1* | 2/2023 | Vankamamidi ......... G06F 3/067 |

OTHER PUBLICATIONS

Noel, R., Rohit M., and P. Lama. "Towards self-managing cloud storage with reinforcement learning." In 2019 IEEE International Conference on Cloud Engineering (IC2E), pp. 34-44. IEEE, 2019.*
Extended European Search Report issued Apr. 28, 2023 in European Application No. 22207134.2.

* cited by examiner

FIG. 5

| ID | PERFORMANCE TIER | TOTAL RIOPS | DELAY TIME | PREVIOUS IOPS REFERENCE | AVERAGE RIOPS |
|---|---|---|---|---|---|
| 1 | 2 | 589,000 | 480 (μs) | 490,000 | 380,000 |
| 2 | 1 | 473,000 | 980 (μs) | 480,000 | 430,000 |
| ⋮ | | | | | |
| M | 3 | 134,000 | 6400 (μs) | 150,000 | 140,000 |

FIG. 6

| ID 1 IOPS REFERENCE | ID 2 IOPS REFERENCE | ... | ID M IOPS REFERENCE |
|---|---|---|---|
| 560,000 | 480,000 | ... | 140,000 |

FIG. 8

| ID | PERFORMANCE TIER | TOTAL RIOPS | DELAY TIME | PREVIOUS IOPS REFERENCE | AVERAGE RIOPS | REFERENCE | OBJ 1 RIOPS | OBJ 2 RIOPS | ... | OBJ K RIOPS |
|---|---|---|---|---|---|---|---|---|---|---|
| 1 | 2 | 589,000 | 480 (μs) | 490,000 | 380,000 | 560,000 | 15,000 | 14,000 | ... | 9,600 |

| OBJ 1 POINT | OBJ 2 POINT | ... | OBJ K POINT |
|---|---|---|---|
| 0.84 | −0.96 | ... | −0.63 |

OBJECT STORAGE SYSTEM, MIGRATION CONTROL DEVICE, AND MIGRATION CONTROL METHOD

CROSS-REFERENCE TO RELATED APPLICATIONS

This application is based on and claims priority under 35 U.S.C. § 119 to Korean Patent Application Nos. 10-2021-0172378, filed on Dec. 3, 2021, and 10-2022-0069699, filed on Jun. 8, 2022, in the Korean Intellectual Property Office, the disclosures of each of which are incorporated by reference herein in their entireties.

BACKGROUND

The inventive concepts relate to an electronic device, and more particularly, to an object storage system, a migration control device, and a migration control method.

With the recent active research into machine learning and the increasing number of platforms for implementing machine learning, the technical accessibility to machine learning has increased. For example, because a neural network used for machine learning mathematically can approximate a number of function, models may be similarly emulated when sufficient data necessary for modeling is obtained (and/or secured).

For example, storage may be classified into object-based storage and block-based storage according to a unit in which data is managed. Object-based storage (hereinafter, referred to as "object storage") is a storage architecture, which stores and manages data as objects. An object refers to data, e.g., video, multimedia data like an image, and a file, which may have a random size. Object storage may be used to manage objects.

When object storage is modeled using a neural network and has a change, such as an increase in the number of devices therein, modeling needs to be redesigned to apply the object storage to real data center systems with different user requirements. In this case, much time is spent on heuristic algorithm calculations, and accordingly, redesign may take a long time.

Therefore, reinforcement learning-based modeling is needed to quickly respond to a change in an object storage system, and there has been increasing research into increasing the quality of service (QoS) of an entire object storage system by assigning an object to an appropriate storage in the object storage system.

SUMMARY

The inventive concepts provide an object storage system for calculating the optimal assignment of objects through multiple neural network inferences, a migration control device, and a migration control method.

According to an aspect of the inventive concept, there is provided a migration control method including observing an information group including first to M-th total target input/output (I/O) throughputs of respective first to M-th storage devices, where M is an integer that is greater than or equal to 2, inferring first to M-th reference I/O throughputs, respectively, with respect to the first to M-th total target I/O throughputs by using a first neural network, observing first to K-th target I/O throughputs of respective first to K-th objects stored in an i-th storage device having an i-th total target I/O throughput, where "i" is an integer that is greater than or equal to 1 and less than or equal to M, and K is an integer that is greater than or equal to 1; inferring first to K-th object points of the respective first to K-th objects by using a second neural network, based on the i-th total target I/O throughput, the i-th reference I/O throughput, and the first to K-th target I/O throughputs, and determining a target object to be migrated and a target storage device by using the second neural network, based on the information group, the first to M-th reference I/O throughputs, the first to K-th target I/O throughputs, and the first to K-th object points, the target object being stored in the target storage device; and generating a command instructing to migrate the target object to the target storage device.

According to another aspect of the inventive concept, there is provided a migration control device including an interface configured to communicate with an object storage device and a processor including a first neural network and a second neural network, wherein the processor may be configured to receive an information group through the interface, the information group including first to M-th total target I/O throughputs of respective first to M-th storage devices included in the object storage device, where M is an integer that is greater than or equal to 2, infer first to M-th reference I/O throughputs, respectively, with respect to the first to M-th total target I/O throughputs by using the first neural network, receive, through the interface, first to K-th target I/O throughputs of respective first to K-th objects stored in an i-th storage device, where "i" is an integer that is greater than or equal to 1 and less than or equal to M, and K is an integer that is greater than or equal to 1, infer first to K-th object points of the respective first to K-th objects by using the second neural network, based on a total target I/O throughput of the i-th storage device (hereafter an "i-th total target I/O throughput"), a reference I/O throughput of the i-th storage device (hereafter an "i-th reference I/O throughput"), and the first to K-th target I/O throughputs, and determine a target object to be migrated and a target storage device by using the second neural network, based on the information group, the first to M-th reference I/O throughputs, the first to K-th target I/O throughputs, and the first to K-th object points, the target object being stored in the target storage device, and transmit, to the object storage device through the interface, a command instructing to migrate the target object to the target storage device.

According to a further aspect of the inventive concept, there is provided an object storage system including an object storage device and a migration control device, the object storage device including first to M-th storage devices and a storage controller configured to control the first to M-th storage devices, where M is an integer that is greater than or equal to 2, and the migration control device including first and second neural networks configured to migrate objects stored in the first to M-th storage devices.

BRIEF DESCRIPTION OF THE DRAWINGS

Embodiments will be more clearly understood from the following detailed description taken in conjunction with the accompanying drawings in which:

FIG. 5 is a diagram for describing a first information group according to at least one embodiment;

FIG. 6 is a diagram for describing references input/output (I/O) throughputs according to at least one embodiment;

FIG. 8 is a diagram for describing a second information group according to at least one embodiment;

FIG. 9 is a diagram for describing object points according to at least one embodiment;

DETAILED DESCRIPTION OF THE EMBODIMENTS

Figure 1:
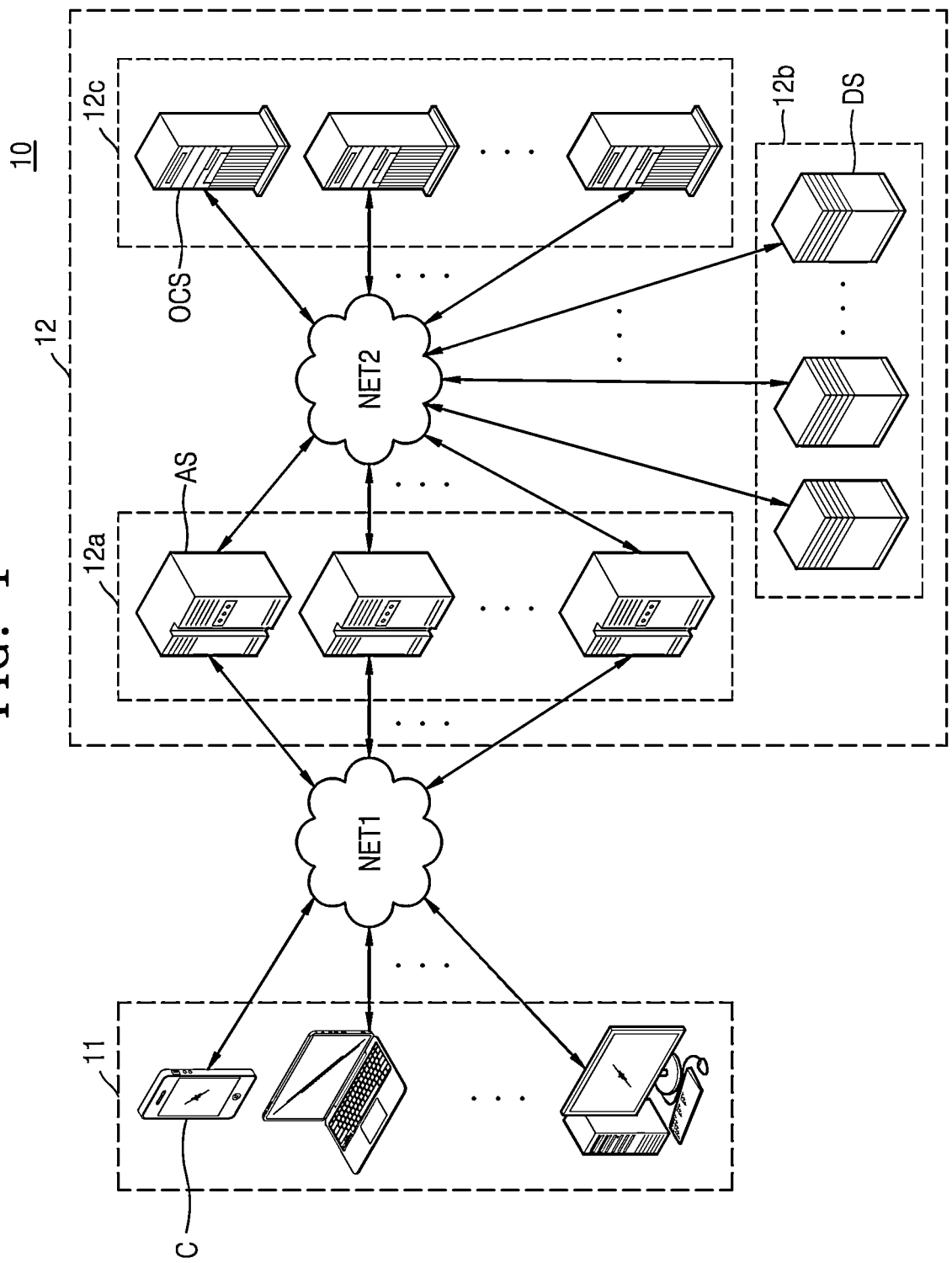
FIG. 1 is a diagram of a network system according to at least one embodiment.

Hereinafter, embodiments are described in detail with reference to the accompanying drawings. Unless indicated otherwise, functional elements in the following description and the corresponding blocks shown in the drawings may be implemented in processing circuitry such as hardware, software, or a combination thereof configured to perform a specific function. For example, the processing circuitry more specifically may be and/or include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), electrical components (such as at least one of transistors, resistors, capacitors, logic gates (including at least one of AND gates, OR gates, NOR gates, NAND gates, NOT gates, XOR gates, etc.), and/or the like).

FIG. 1 is a diagram of a network system according to at least one embodiment.

Referring to FIG. 1, a network system 10 may include a client group 11 and a data center 12.

The client group 11 may include one or more client devices (e.g., a plurality of client devices C). The client devices C may communicate with the data center 12 through a first network NET1, e.g., the Internet. The client devices C may include various electronic devices, such as an autonomous vehicle, an internet of things (IoT) integrated device, a smartphone, a smart pad, a notebook computer, a personal computer, a smart camera, a smart television, and/or the like.

The data center 12 may include a facility that saves various kinds of data and/or provides services. The data center 12 may implement an object storage system. For example, the data center 12 may include a plurality of groups (e.g., an application server group 12a, a database server group 12b, and/or an object cache server group 12c). The groups (e.g., application server group 12a, the database server group 12b, and/or the object cache server group 12c) may communicate with one another through a second network NET2, e.g., a local area network (LAN) and/or an intranet.

In at least one embodiment, the application server group 12a may include a plurality of application server devices AS. The application server devices AS may process requests, which are received from the client group 11 through the first network NET1 and may access the database server group 12b or the object cache server group 12c according to the requests of the client group 11. For example, the application server devices AS may store data, which is requested by the client group 11 to be stored, in the database server group 12b through the second network NET2. The application server devices AS may include computer-readable medium, which may be a computer-readable signal medium and/or a computer-readable recording medium, and processing circuitry configured to process the requests. The computer readable media may be, for example, a non-transitory computer readable media. The term "non-transitory," as used herein, is a description of the medium itself (e.g., as tangible, and not a signal) as opposed to a limitation on data storage persistency (e.g., RAM vs. ROM). The computer-readable medium may be (and/or include), but is not limited thereto, an electronic storage device, a magnetic storage device, an optical storage device, an electromagnetic storage device, a semiconductor storage device, and/or a combination thereof. The application server devices AS may store part of the data, which is stored in the database server group 12b through the second network NET2, in the object cache server group 12c. The application server devices AS may obtain data, which is requested by the client group 11 to be read, from the object cache server group 12c through the second network NET2. When the requested data is not in the object cache server group 12c, the application server devices AS may obtain the requested data from the database server group 12b through the second network NET2.

The database server group 12b may include a plurality of database server devices DS. The plurality of database server devices DS may include computer-readable medium and processing circuitry configured to manage the operation of the plurality of databased server devices DS. The database server devices DS may store data that has been processed by the application server devices AS and may provide data to the application server devices AS at the requests of the application server devices AS. Each of the database server devices DS may provide non-volatile, high-capacity storage. For example, in at least one example embodiment, the processing circuitry of a database server device DS may process a request from an application server device AS.

The object cache server group 12c may include a plurality of object cache server devices OCS. The plurality of cache server devices OCS may include computer-readable medium and processing circuitry configured to manage the operation of the plurality of object cache server devices OCS. The object cache server devices OCS may temporarily store data to be stored in the database server devices DS and/or data read from the database server devices DS. The object cache server devices OCS may function as caches between the application server devices AS and the database server devices DS. The object cache server devices OCS may respond to the requests of the application server group 12a at a higher response speed than the database server devices DS. As described above, each of the object cache server devices OCS may provide high-speed storage.

It is important to improve the efficiency of (e.g., optimize) the assignment of objects stored in an object storage system in order to increase an average quality of service (QoS) value of a user in the object storage system.

Figure 2:
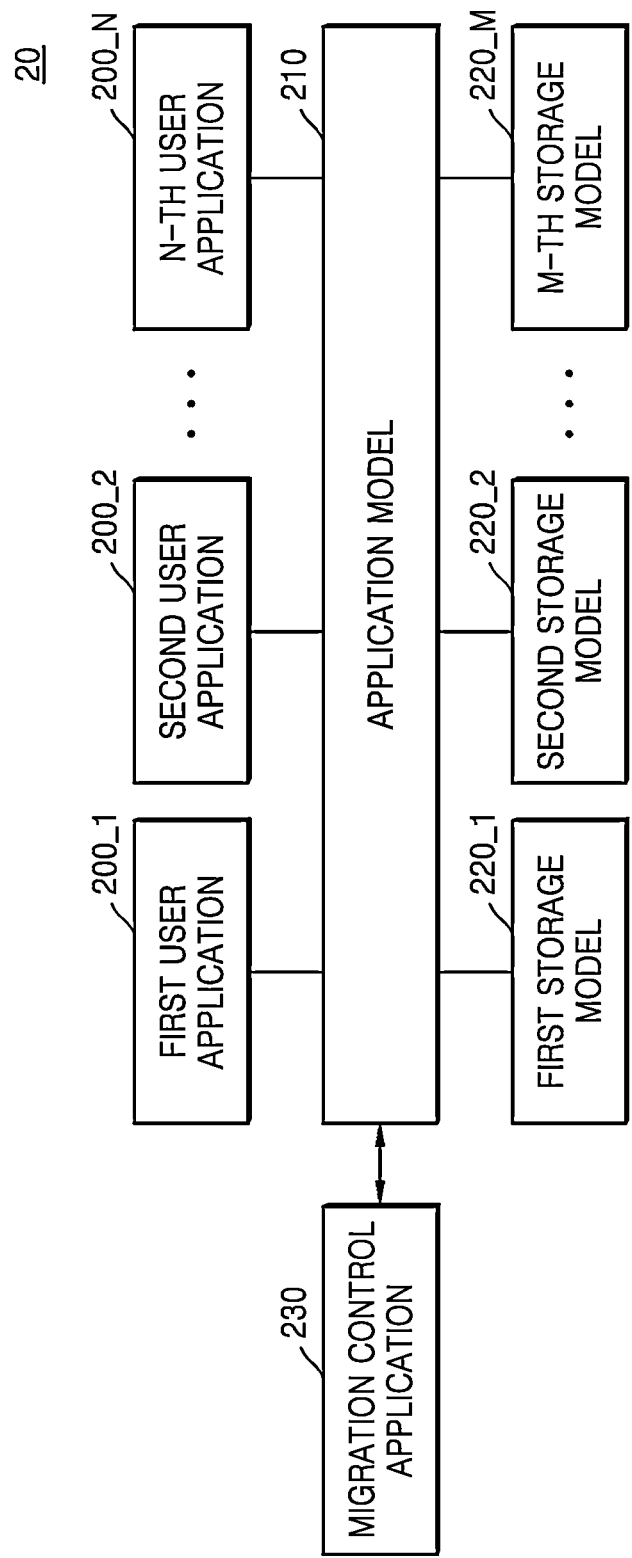
FIG. 2 is a diagram of an object storage system model according to at least one embodiment.

FIG. 2 is a diagram of an object storage system model according to at least one embodiment.

Referring to FIG. 2, an object storage system model 20 may result from modeling an object storage system. The object storage system model 20 may include a plurality of user applications e.g., (first to N-th user applications 200_1 to 200_N), an application model 210, a plurality of storage models (e.g., first to M-th storage models 220_1 to 220_M), and a migration control application 230. In at least one embodiment, the plurality of user applications and the plurality of storage models may, respectively, represent and/or model the client group 11 and the data center 12 (and/or programs, signals, processes, requests, etc., provided therein).

The first to N-th user applications 200_1 to 200_N may be actual user applications and/or models of actual user applications and may output a request for accessing a storage model according to a predetermined (and/or otherwise determined) workload. For example, the first user application 200_1 may output a read request for an object. At this time, the read request may be output in correspondence to a target input/output (I/O) throughput. Here, the I/O throughput may be referred to as I/O operations per second (IOPS). A user application may output a request for each of at least two storage models. For example, the first user application 200_1 may output a first read request for the first storage model 220_1 and a second read request for the second storage model 220_2. The number of user applications may be greater than or equal to 2, and N may be an integer that is greater than or equal to 2. However, a single user application may be included in the object storage system model 20 in some embodiments.

The application model 210 may result from modeling an application actually controlling object storage. For example, the application model 210 may result from modeling based on data obtained from a real-world application. The application model 210 may respectively provide requests of the first to N-th user applications 200_1 to 200_N to the first to M-th storage models 220_1 to 220_M. The application model 210 may be connected in parallel to the first to N-th user applications 200_1 to 200_N. The first to N-th user applications 200_1 to 200_N may be connected in parallel to the first to M-th storage models 220_1 to 220_M.

In at least one embodiment, the application model 210 may store a map table including the mapping relationship between an object number and a storage model number, wherein the object number may identify an object, and the storage model number may identify a storage model storing the object corresponding to the object number. Because a particular object is stored in a particular storage model, a read request for the particular object needs to be provided to the particular storage model storing the particular object. The application model 210 may provide the read request for the particular object to the particular storage model by using the map table.

The first to M-th storage models 220_1 to 220_M may result from modeling actual object storage. For example, the first to M-th storage models 220_1 to 220_M may result from modeling based on data obtained from a real-world object storage. Object storage may include a device managing data in object units. Each of the first to M-th storage models 220_1 to 220_M may store at least one object. For example, the first storage model 220_1 may store first to K-th objects. However, the example embodiments are not limited thereto. Here, K may be an integer that is greater than or equal to 1. Each of the first to M-th storage models 220_1 to 220_M may receive a read request from the application model 210 and may output a response to the read request. Here, the response may include an identifier of a storage model corresponding to the read request and a performance tier of the storage model. The number of storage models may be greater than or equal to 2, and M may be an integer that is greater than or equal to 2. However, in some embodiments, a single storage model may be included in the object storage system model.

In at least one embodiment, each storage model may output information including a total target I/O throughput, in response to a request provided from the application model 210. For example, the first storage model 220_1 may provide information including a first total target I/O throughput to the application model 210. The first to M-th storage models 220_1 to 220_M may output information including first to M-th total target I/O throughputs. An information group may include information including a first total target I/O throughput to information including an M-th total target I/O throughput. For example, the information group may include the first to M-th total target I/O throughputs. A total target I/O throughput may be the sum of the respective target I/O throughputs of objects stored in each storage model.

In at least one embodiment, the information group may further include first to M-th identifiers, first to M-th performance tiers, first to M-th delay times, first to M-th previous reference I/O throughputs, and first to M-th average target I/O throughputs. An identifier may identify a storage model. A performance tier may indicate the performance of a storage model. For example, the lower the performance tier, the higher the performance of the storage model, and the higher the performance tier, the lower the performance of the storage model. However, the example embodiments are not limited thereto. A delay time may refer to a time taken to process I/O. A previous reference I/O throughput may refer to a reference I/O throughput inferred in a previous cycle. An average target I/O throughput may refer to an average of target I/O throughputs that have occurred in previous cycles. For example, an average of target I/O throughputs occurring during "x" may be an average target I/O throughput, where "x" may be several seconds or minutes but is not limited thereto.

In at least one embodiment, each storage model may output a target I/O throughput of at least one object in response to a request provided from the application model 210. For example, the first storage model 220_1 may provide respective first to K-th target I/O throughputs of first to K-th objects to the application model 210. However, the example embodiments are not limited thereto.

The migration control application 230 may result from modeling software using reinforcement learning. In at least one embodiment, the migration control application 230 may be implemented on a computer. In some embodiments, the migration control application 230 may be implemented by a processor included in a hardware device.

The migration control application 230 may communicate with the application model 210. The migration control application 230 may receive an information group from the application model 210.

In at least one embodiment, the migration control application 230 may select a target object and a target storage model, based on the information group and a plurality of target I/O throughputs. The target object may refer to an object to be migrated among objects stored in a particular storage model. The target storage model may refer to a storage model in which the target object is to be stored.

Figure 3:
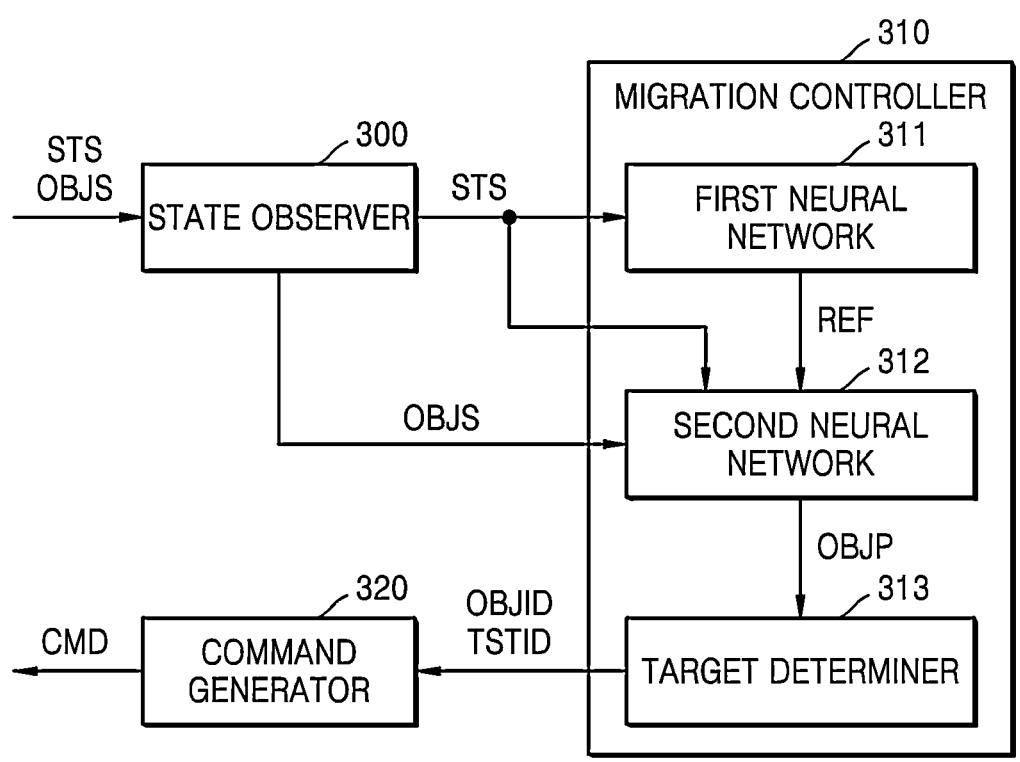
FIG. 3 is a diagram of a migration control application according to at least one embodiment.

FIG. 3 is a diagram of a migration control application according to at least one embodiment.

Referring to FIG. 3, a migration control application 30 may include a state observer 300, a migration controller 310, and a command generator 320. The migration control application 30 may be the same as and/or substantially similar to the migration control application 230 of FIG. 2. For example, the migration control application 30 may be a migration control application trained by (and/or to be trained using) the object storage system model 20. In at least one embodiment, the trained migration control application 30 may be employed in the data center 12 to participate in the assignment of object storage and/or migration, as described in further detail below.

The state observer 300 may observe a storage state STS and an object state OBJS. Each of the storage state STS and the object state OBJS may represent a state value used for reinforcement learning. For example, the state value may be referred to as an input of reinforcement learning. In at least one embodiment, the storage state STS may be a state value used in a first neural network 311 and a second neural network 312, and the object state OBJS may be a state value used in the second neural network 312. For example, the storage state STS may include the information group described above (e.g., in regard to FIG. 2) and/or the object state OBJS may correspond to a target I/O throughput of at least one object. The state observer 300 may observe the storage state STS and the object state OBJS in real time.

The migration controller 310 may provide an object identifier OBJID and a target storage identifier TSTID to the command generator 320, based on the storage state STS and the object state OBJS.

In at least one embodiment, the migration controller 310 may include the first neural network 311, the second neural network 312, and a target determiner 313.

The first neural network 311 may receive the storage state STS as an input and may output a reference value REF. Here, the reference value REF may correspond to an action value compared with a total target I/O throughput of a storage model. Here, the action value may also be referred to as an output of reinforcement learning. With respect to a storage model having a total target I/O throughput that is greater than or equal to a certain (e.g., threshold) reference, some objects stored in the storage model need to be migrated to another storage model and, in at least one embodiment, are marked for migration. The reference value REF may include at least one reference I/O throughput. When there is one storage model, there is one total target I/O throughput. Accordingly, in at least one embodiment, as many reference I/O throughputs as the number of storage models may be included in the reference value REF.

In at least one embodiment, the first neural network 311 may have, as inputs, the respective first to M-th total target I/O throughputs of the first to M-th storage models 220_1 to 220_M and may infer the first to M-th reference I/O throughputs for the first to M-th total target I/O throughputs, respectively.

The second neural network 312 may receive the storage state STS, the reference value REF, and the object state OBJS as inputs and may output an object point OBJP. Here, the object point OBJP may be a numerical value for selecting an object to be migrated. When a single storage model stores a plurality of objects, the object point OBJP may be generated for each of the objects. The second neural network 312 may operate with respect to a single storage. In these cases, the object point OBJP may correspond to a state value of an object stored in the single storage.

In at least one embodiment, the second neural network 312 may infer first to K-th object points for first to K-th objects, respectively, based on the total target I/O throughput, reference I/O throughput, and first to K-th target I/O throughputs of a single storage model.

The target determiner 313 may transmit the object identifier OBJID and the target storage identifier TSTID to the command generator 320, based on the object point OBJP.

In at least one embodiment, the target determiner 313 may determine a target object to be migrated and a target storage device, in which the target object is to be stored, based on an information group, first to M-th reference I/O throughputs, first to K-th target I/O throughputs, and first to K-th object points.

In at least one embodiment, the second neural network 312 and the target determiner 313 may be implemented in a single (e.g., in the same) neural network.

According to the description above, a large number of objects (e.g., at least several thousands of objects) may be easily managed through a single inference procedure by the second neural network 312 and the target determiner 313, and accordingly, the average QoS may be increased.

According to the description above, an effective (and/or the optimal) assignment of objects may be calculated through a plurality of neural network inferences (e.g., an inference by the first neural network 311 and an inference by the second neural network 312), and accordingly, the average QoS for a user's object requests may be increased.

Figure 4:
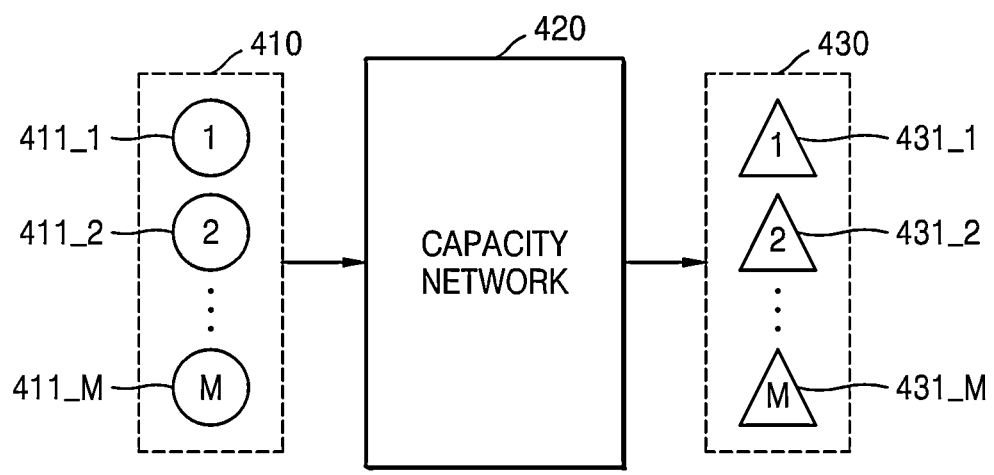
FIG. 4 is a diagram for describing a first neural network according to at least one embodiment.

FIG. 4 is a diagram for describing a first neural network according to at least one embodiment, FIG. 5 is a diagram for describing a first information group according to at least one embodiment, and FIG. 6 is a diagram for describing reference I/O throughputs according to at least one embodiment.

Referring to FIGS. 2 and 4, a first information group 410 may include first to M-th storage states 411_1 to 411_M. The first to M-th storage states 411_1 to 411_M may include information about the first to M-th storage models 220_1 to 220_M. For example, the first storage state 411_1 may include information about the first storage model 220_1, the second storage state 411_2 may include information about the second storage model 220_2, the M-th storage state 411_M may include information about the M-th storage model 220_M, etc.

Referring to FIGS. 2, 4, and 5, information about a storage may include an identifier (ID), a performance tier, a total target I/O throughput, e.g., total read IOPS (RIOPS), a delay time, a previous reference I/O throughput (e.g., a previous IOPS reference), an average target I/O throughput (e.g., average RIOPS), and/or the like. In at least one example, the first information group 410 may include first to M-th total target I/O throughputs, first to M-th IDs, first to M-th performance tiers, first to M-th delay times, first to M-th previous reference I/O throughputs, first to M-th average target I/O throughputs, and/or the like. For example, in the case illustrated in FIG. 5, regarding the first storage state 411_1, the ID of the first storage model 220_1 may be 1, the performance tier of the first storage model 220_1 may be 2, the total RIOPS of the first storage model 220_1 may be 589,000, the delay time of the first storage model 220_1 may be 480 μs, the previous IOPS reference of the first storage model 220_1 may be 490,000, and the average RIOPS of the first storage model 220_1 may be 380,000; regarding the second storage state 411_2, the ID, performance tier, total RIOPS, delay time, previous IOPS reference, and average RIOPS of the second storage model 220_2 may respectively be "2", "1", "473,000", "980 μs", "480,000", and "430,000"; and regarding the M-th storage state 411_M, the ID, performance tier, total RIOPS, delay time, previous IOPS reference, and average RIOPS of the M-th storage model 220_M may respectively be "M", "3", "134,000", "6400 μs", "150,000", and "140,000". However, the example embodiments are not limited thereto.

Referring to FIGS. 3 and 4, the first neural network 311 may correspond to a capacity network 420. The capacity network 420 may have the first information group 410 of all storage models as an input and may infer a first action group

430. The capacity network 420 may infer a reference I/O throughput of each storage model by performing a multiple inference procedure. Because the capacity network 420 infers an action using the states of a plurality of storage models, the capacity network 420 of at least one embodiment may need to be retrained when the number of storage models in an object storage system model is changed. The first action group 430 may include first to M-th reference I/O throughputs 431_1 to 431_M, respectively, with respect to the first to M-th total target I/O throughputs.

Referring to FIGS. 2, 4, and 6, each reference I/O throughput may correspond to a total target I/O throughput (e.g., total RIOPS) of each storage model. For example, the first reference I/O throughput 431_1 (e.g., the ID 1 IOPS reference) may correspond to the total RIOPS of the first storage model 220_1; the second reference I/O throughput 431_2 (e.g., ID 2 IOPS reference) may correspond to the total RIOPS of the second storage model 220_2; and the M-th reference I/O throughput 431_M (e.g., ID M IOPS reference) may correspond to the total RIOPS of the M-th storage model 220_M. Specifically, the first reference I/O throughput, ID 1 IOPS reference, may be 560,000. The second reference I/O throughput, ID 2 IOPS reference, may be 480,000. The M-th reference I/O throughput, ID M IOPS reference, may be 140,000. However, the example embodiments are not limited thereto.

Figure 7:
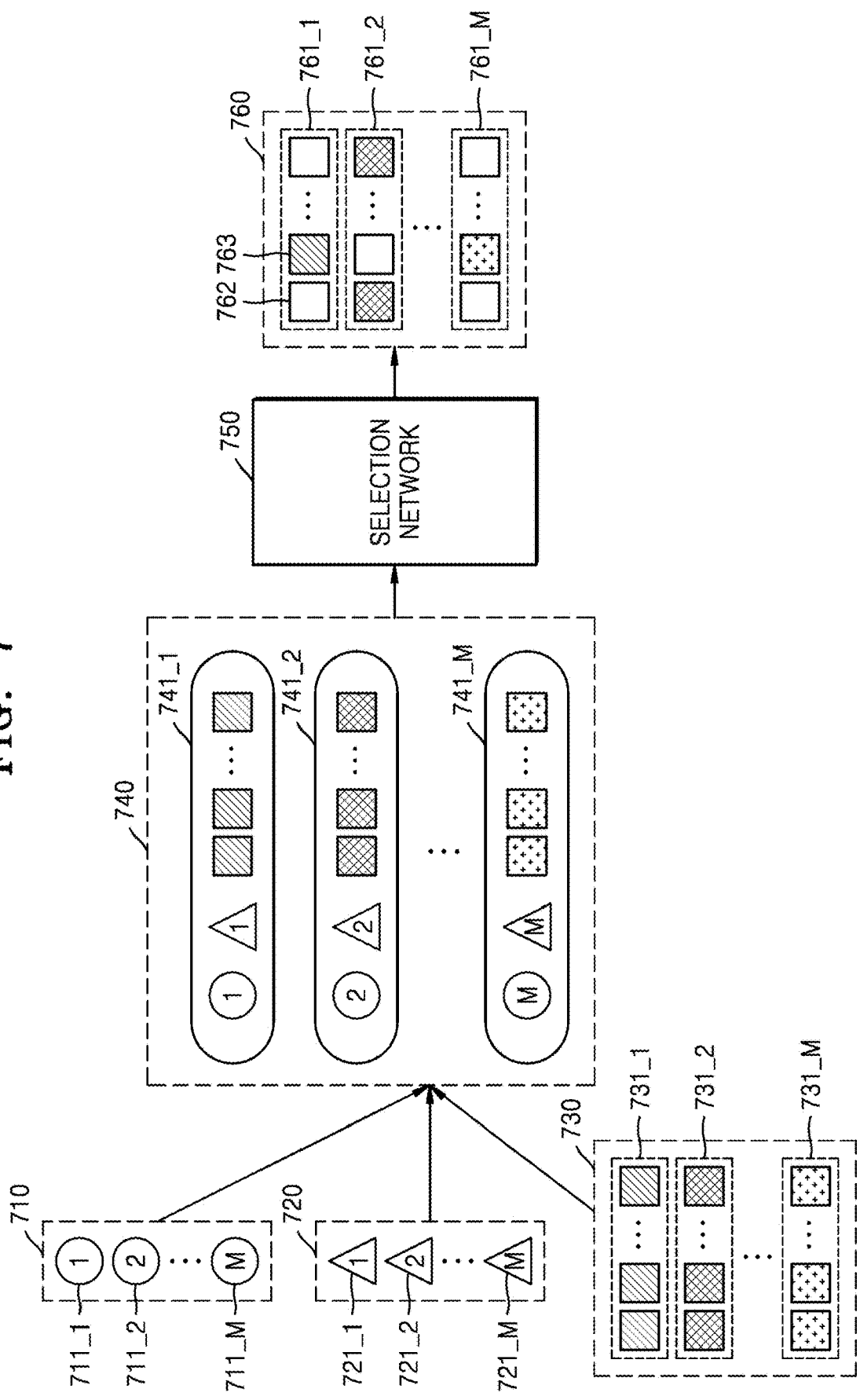
FIG. 7 is a diagram for describing a second neural network according to at least one embodiment.

FIG. 7 is a diagram for describing a second neural network according to at least one embodiment, FIG. 8 is a diagram for describing a second information group according to at least one embodiment, and FIG. 9 is a diagram for describing object points according to at least one embodiment.

Referring to FIGS. 2, 4, and 7, a first information group 710 may correspond to the first information group 410, first to M-th storage states 711_1 to 711_M may respectively correspond to the first to M-th storage states 411_1 to 411_M, a first action group 720 may correspond to the first action group 430, and first to M-th reference I/O throughputs 721_1 to 721_M may respectively correspond to the first to M-th reference I/O throughputs 431_1 to 431_M.

Referring to FIGS. 2 and 7, an object group 730 may include an object state group of each of the first to M-th storage models 220_1 to 220_M. The object state group may include at least one state of an object stored in a particular storage model. For example, a first object state group 731_1 may include a target I/O throughput of at least one object stored in the first storage model 220_1; a second object state group 731_2 may include a target I/O throughput of at least one object stored in the second storage model 220_2; and an M-th object state group 731_M may include a target I/O throughput of at least one object stored in the M-th storage model 220_M.

Referring to FIG. 7, second information groups 740 may include the first information group 710, the first action group 720, and the object group 730. Each second information group may include a storage state, a reference I/O throughput, and an object state group. For example, a second information group 741_1 for the first storage model 220_1 may include the first storage state 711_1, the first reference I/O throughput 721_1, and the first object state group 731_1; a second information group 741_2 for the second storage model 220_2 may include the second storage state 711_2, the second reference I/O throughput 721_2, and the second object state group 731_2; and/or a second information group 741_M for the M-th storage model 220_M may include the M-th storage state 711_M, the M-th reference I/O throughput 721_M, and the M-th object state group 731_M.

Referring to FIGS. 3 and 7, the second neural network 312 may correspond to a selection network 750. The selection network 750 may have, as an input, a second information group of each storage model, which has at least a reference I/O throughput, among the second information groups 740, and may infer second action groups 760 per each of the storage model. The selection network 750 may perform a single inference procedure and sequentially infer second action groups for each storage model. Each second action group may include information about an object to be migrated and information about an object that is not migrated. For example, in a second action group 761_1 for the first storage model 220_1, an object 762 may be an object to be migrated, and an object 763 is an object that is not migrated. Other second action groups 761_2 to 761_M may be the same as and/or similar to the second action group 761_1 described above.

Because the selection network 750 infers an action using the state of a single storage model, the selection network 750 may not need to be retrained when the number of storage models in an object storage system model is changed. Accordingly, even when the number of storage models in an object storage system model is changed, a system change may be quickly responded by quickly retraining only the capacity network 420. For example, the capacity network 420 may be retrained, while the training of the selection network 750 is frozen, when the number of storage models in the object storage system model is changed.

The example illustrated in FIG. 8 may correspond to the second information group 741_1 for the first storage model 220_1. The second information group 741_1 for the first storage model 220_1 may include a first information group 810, a first action group 820, and a first object state group 830, but the example embodiments are not limited thereto.

As shown in FIG. 5, the first information group 810 may include the ID, performance tier, total target I/O throughput (e.g., "total RIOPS"), delay time, previous reference I/O throughput (e.g., "previous IOPS reference"), average target I/O throughput (e.g., "average RIOPS") and/or the like, of the first storage model 220_1.

As shown in FIG. 6, the first action group 820 may include a first reference—I/O throughput, (e.g., "ID 1 IOPS reference").

As show in FIG. 8, the first object state group 830 may include first to K-th target I/O throughputs (e.g., OBJ 1 RIOPS, OBJ 2 RIOPS, . . . , and OBJ K RIOPS) stored in the first storage model 220_1. For example, the first to K-th target I/O throughputs, (e.g., OBJ 1 RIOPS, OBJ 2 RIOPS, . . . , and OBJ K RIOPS) may respectively illustrated as "15,000", "14,000", . . . , and "9,600" but are not limited thereto.

The embodiment of FIG. 9 may correspond to first to K-th object points (e.g., OBJ 1 POINT, OBJ 2 POINT, . . . , and OBJ K POINT) which are inferred through a single inference procedure by the selection network 750. An object point may have a negative or positive sign. In at least one embodiment, the object point may range from, e.g., −1 to 1. For example, the first to K-th object points (e.g., OBJ 1 POINT, OBJ 2 POINT, . . . , and OBJ K POINT) are respectively illustrated as "0.84", "−0.96", . . . , and "−0.63" but the example embodiments are not limited thereto. Here, the range of the object point may be referred to as an action space.

Figure 10:
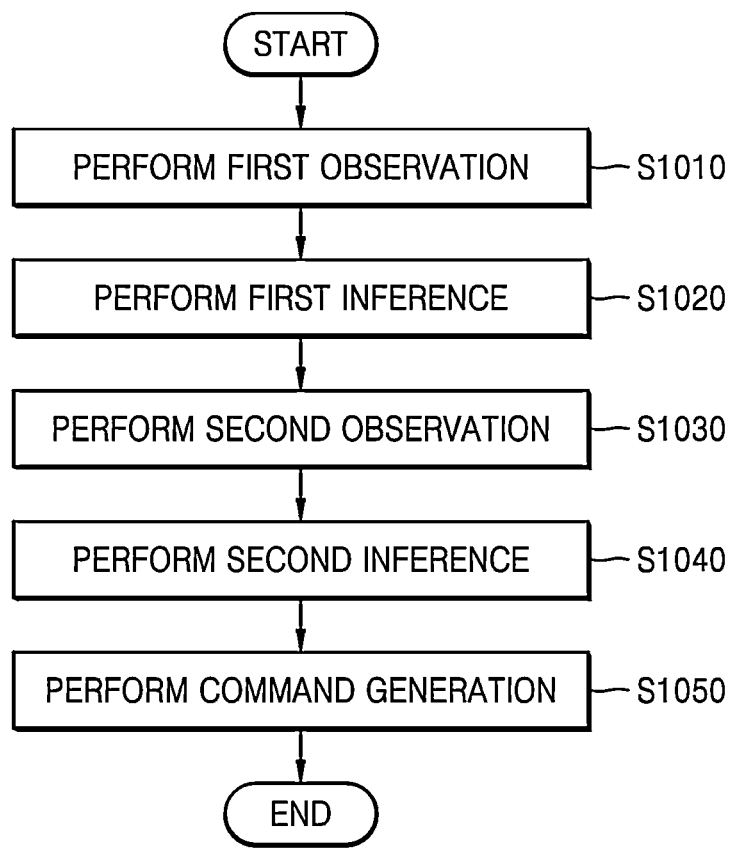
FIG. 10 is a flowchart of a migration control method according to at least one embodiment.

FIG. 10 is a flowchart of a migration control method according to at least one embodiment.

Referring to FIG. 10, the migration control method may include a method of controlling migration of at least one object. The migration control method may be performed by the migration control application 230 described above. Alternatively, the migration control method may be performed by an electronic device including the migration control application 230. The migration control method may be implemented on a computer. For example, a simulation method may be executed on a computer program stored in a computer-readable recording medium.

A first observation may be performed in operation S1010. For example, the migration control application 230 may observe an information group. The information group may include first to M-th total target I/O throughputs of respective first to M-th storage devices. Referring to FIG. 2, the first to M-th storage devices may be real devices respectively corresponding to the first to M-th storage models 220_1 to 220_M. Embodiments of operation S1010 have been specifically described above with reference to FIGS. 3 and 4.

A first inference may be performed in operation S1020. For example, the migration control application 230 may infer first to M-th reference I/O throughputs, respectively, with respect to the first to M-th total target I/O throughputs by using a first neural network (or a capacity network). Embodiments of operation S1020 have been specifically described above with reference to FIGS. 4 to 6.

A second observation may be performed in operation S1030. For example, the migration control application 230 may observe first to K-th target I/O throughputs of respective first to K-th objects stored in an i-th storage device, where "i" is an integer that is greater than or equal to 1 and less than or equal to M. In at least one embodiment, the i-th storage device may have an i-th total target I/O throughput that is greater than an i-th reference I/O throughput. When a storage device among the first to M-th storage devices has a total target I/O throughput that is less than or equal to a reference I/O throughput, an object stored in the storage device does not need to be migrated, and accordingly, the target I/O throughput of the object stored in the storage device may not need to be observed. Accordingly, an inference operation of a second neural network may be quickly performed. Embodiments of operation S1030 have been specifically described above with reference to FIGS. 3 and 7. The total target I/O throughput has been described above with reference to FIG. 5, the reference I/O throughput has been described above with reference to FIG. 6, and the target I/O throughput has been described above with reference to FIG. 8 (e.g., the first object state group 830).

A second inference may be performed in operation S1040. For example, the migration control application 230 may infer respective first to K-th object points of the first to K-th objects by using the second neural network (or a selection network), based on the i-th total target I/O throughput, the i-th reference I/O throughput, and the first to K-th target I/O throughputs. In addition, the migration control application 230 may determine a target object and a target storage device by using the second neural network, based on the information group, the first to M-th reference I/O throughputs, the first to K-th target I/O throughputs, and the first to K-th object points. The target object may be an object to be migrated. The target storage device may be a storage device in which the target object is stored.

Command generation may be performed in operation S1050. For example, the migration control application 230 may generate a command instructing the migration of the target object to the target storage device and transmit the command to an object storage system.

Figure 11:
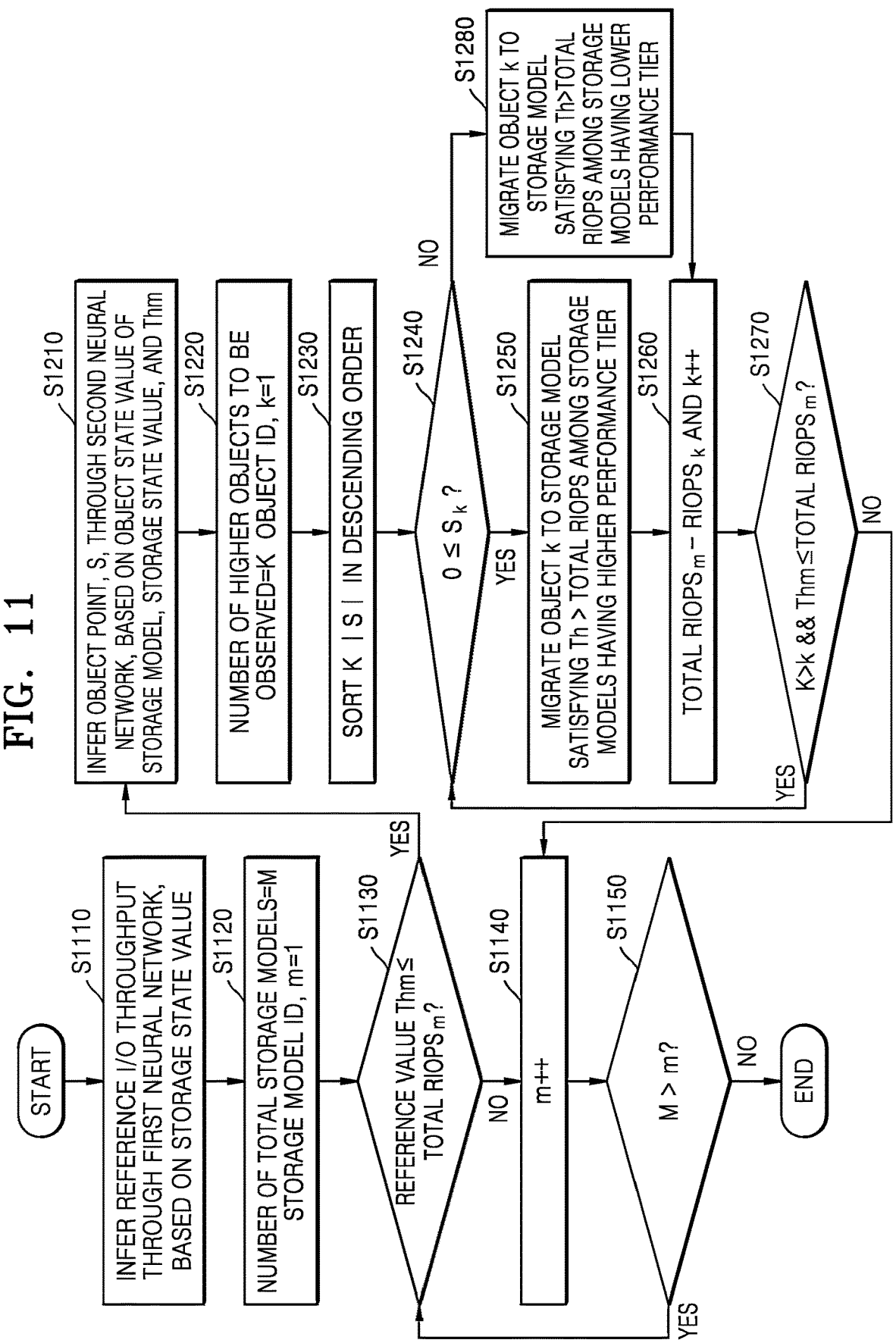
FIG. 11 is a detailed flowchart of a migration control method according to at least one embodiment.

FIG. 11 is a detailed flowchart of a migration control method according to at least one embodiment.

Referring to FIG. 11, a reference I/O throughput may be inferred through a first neural network, based on a storage state value, in operation S1110. Embodiments of operation S1110 have been specifically described above with reference to FIGS. 3 to 6.

The number of total storage models may be determined to be M and an ID (hereinafter, referred to as "m") of a storage model may start from "1", in operation S1120. However, the example embodiments are not limited thereto, and "m" may start from "0" and/or another number. The storage model has been described above with reference to FIG. 2. In some embodiments, a real storage device instead of a storage model may be used in the present embodiment, and "m" may correspond to the i-th storage device described above with reference to FIG. 10.

Whether a reference value Thm (e.g., a reference value for the storage model corresponding to "m") is less than or equal to total RIOPSm (or a total target I/O throughput of the storage model corresponding to "m") may be determined in operation S1130.

When the reference value Thm is greater than the total RIOPSm in operation S1130, the value of "m" may be increased (e.g., by one) in operation S1140. Whether M is greater than "m" may be determined in operation S1150.

When M is less than or equal to "m" (e.g., in the case of NO) in operation S1150, the migration control method ends.

When M is greater than "m" (e.g., in the case of YES) in operation S1150, operation S1130 may be performed.

When the reference value Thm is less than or equal to the total RIOPSm (e.g., in the case of YES) in operation S1130, object points S may be inferred through a second neural network, based on the object state value of the storage model, the storage state value, and the reference value Thm in operation S1210. Embodiments of operation S1210 have been specifically described above with reference to FIGS. 7 to 9. For example, the storage state value may correspond to the first information group 810 in FIG. 8. For example, the reference value Thm may correspond to the first action group 820 in FIG. 8. For example, the object state value may correspond to the first object state group 830 in FIG. 8. For example, the object point S may be the same as shown in FIG. 9.

The number of higher objects to be observed may be determined to be K, and an ID (hereinafter, referred to as "k") of an object may start from "1", in operation S1220. However, embodiments are not limited thereto, and "k" may start from "0" and/or another number. For example, when "k" is 1, an object having the largest object point may be selected from among the objects that have been observed. When "k" is 2, an object having the second largest object point may be selected from among the objects that have been observed. As described above, when "k" increases, it is assumed that an object having the next largest object point is selected.

K absolute values of the object points S, |S|, may be sorted in descending order in operation S1230. For example, referring to FIG. 9, the absolute values of the first to K-th object points (e.g., OBJ 1 POINT, OBJ 2 POINT, . . . , and OBJ K POINT) may be "0.84", "0.96", . . . , and "0.63" and may be sorted (like "0.96", "0.84", . . . ) in descending order. At this time, when the ID of an object (e.g., "k") is 1, the object may have the largest |S|. In at least one embodiment, an object corresponding to the largest object point among the first to K-th object points (e.g., OBJ 1 POINT, OBJ 2 POINT, . . . , and OBJ K POINT) may be determined to be a first target object. For example, referring to FIG. 9, when "0.96" is the largest |S|, an object corresponding to "0.96" may be determined to be the first target object.

Whether object point of "k" $S_k$ is greater than or equal to 0 (e.g., whether $S_k$ is a positive number) may be determined in operation S1240, e.g., to determine a storage model (or a storage device), in which a target object is stored, according to the sign of an object point. In at least one embodiment, a storage device having a different performance tier than a storage device (e.g., the i-th storage device described with reference to FIG. 10), which currently stores a target object, may be selected as a target storage device, in which the target object will be stored.

When $S_k$ is a negative number (e.g., in the case of NO) in operation S1240, the object corresponding to "k" (hereinafter, referred to as the object "k") may be migrated to a storage model, which has total RIOPS that is less than a reference value Th, among storage models, which have a lower performance tier than the storage model currently storing the object "k", in operation S1280. For example, referring to FIGS. 5, 6, 8, and 9, the i-th storage device or "m" may be the first storage model 220_1. For clarity and brevity of description, the following is based on the illustrated values, wherein a second object point (e.g., OBJ 2 POINT), is depicted as the largest object point; however, the example embodiments are not limited thereto. At this time, OBJ 2 POINT is a negative number. Because the performance tier of the first storage model 220_1 is "2", a storage model having a lower performance tier (e.g., "3") than "2" may be selected. Because the performance tier of the M-th storage model 220_M is "3", the total target I/O throughput (or the total RIOPSm) of the M-th storage model 220_M is "134,000", and the M-th reference I/O throughput (e.g., the ID M IOPS reference) is "140,000", an object having an object point of "−0.96" may be migrated to the M-th storage model 220_M. In some embodiments, the target object may be migrated to a storage device (or a storage model) satisfying "Thm≥total RIOPSm+target I/O throughput of the target object".

Otherwise, when $S_k$ is 0 or a positive number (e.g., in the case of YES) in operation S1240, the object "k" may be migrated to a storage model, which has total RIOPS that is less than the reference value Th, among storage models, which have a higher performance tier than the storage model currently storing the object "k", in operation S1250. In at least one embodiment, the largest object point may be a positive number, a storage device having a higher performance tier than the i-th storage device among the first to M-th storage devices may be selected as a first target storage device, and the first target object may be migrated to the first target storage device.

Although not shown, in an example with reference to FIGS. 5, 6, 8, and 9, in the cases wherein the second object point (e.g., OBJ 2 POINT) is not "−0.96" but "0.96" a storage model (e.g., the second storage model 220_2), which has a higher performance tier (e.g., "1") than the performance tier "2" and total RIOPS (e.g., "473,000") less than the reference value Th (e.g., "480,000"), may be selected.

RIOPS of "k" $RIOPS_k$ may be subtracted from the total $RIOPS_m$, and the value of "k" may be increased by one, in operation S1260. In an embodiment, a target I/O throughput corresponding to the largest object point may be subtracted from the total target I/O throughput of the first target storage device among the first to M-th total target I/O throughputs. For example, referring to FIGS. 8 and 9, "575,000" results from subtracting "14,000", e.g., the target I/O throughput of the second object (e.g., OBJ 2 RIOPS), from "589,000", e.g., the total RIOPS, in FIG. 8. When "k" is increased, whether an object having the next largest object point is the target object may be determined.

Whether K is greater than "k" and whether the reference value Thm is less than or equal to the total $RIOPS_m$ may be determined in operation S1270. Both conditions, e.g., the condition that K is greater than "k" and the condition that the reference value Thm is less than or equal to the total $RIOPS_m$, need to be satisfied. In operation S1270, the reference value Thm may be the i-th reference I/O throughput, e.g., "480,000". In operation S1270, the total $RIOPS_m$ may be a value, e.g., "575,000", which is obtained by subtracting the target I/O throughput from the i-th total target I/O throughput.

When K is greater than "k" and the reference value Thm is less than or equal to the total $RIOPS_m$ (e.g., in the case of YES) in operation S1270, operation S1240 may be performed. Specifically, for example, "575,000" is greater than the reference value Thm, e.g., "480,000", and accordingly, operation S1240 may be performed. In at least one embodiment, an object corresponding to the second largest object point (e.g., the first object point, e.g., OBJ 1 POINT) among the first to K-th object points (e.g., OBJ 1 POINT, OBJ 2 POINT, . . . , OBJ K POINT) may be determined to be a second target object. A storage device, which has a different performance tier than the i-th storage device, may be selected as a second target storage device, in which the second target object will be stored, according to the sign of the second largest object point. For example, in the case wherein the i-th storage device or "m" is still the first storage model 220_1 the first object point (e.g., OBJ 1 POINT) is the second largest object point. In this case, an object having the first object point, e.g., OBJ 1 POINT, may be the second target object. Because the first object point (e.g., OBJ 1 POINT) is a positive number, and the performance tier is "2", a second target storage model (or the second target storage device) may be a storage model (e.g., the second storage model 220_2), which has a performance tier (e.g., "1") higher than the performance tier "2" and total RIOPS (e.g., "473,000") less than the reference value Thm (e.g., "480,000").

When K is less than or equal to "k" or the reference value Thm is greater than the total $RIOPS_m$ (where, the total $RIOPS_m$ has been decreased from an initial value by the target I/O throughput of every selected target object) (e.g., in the case of NO) in operation S1270, operation S1140 may be performed.

Figure 12:
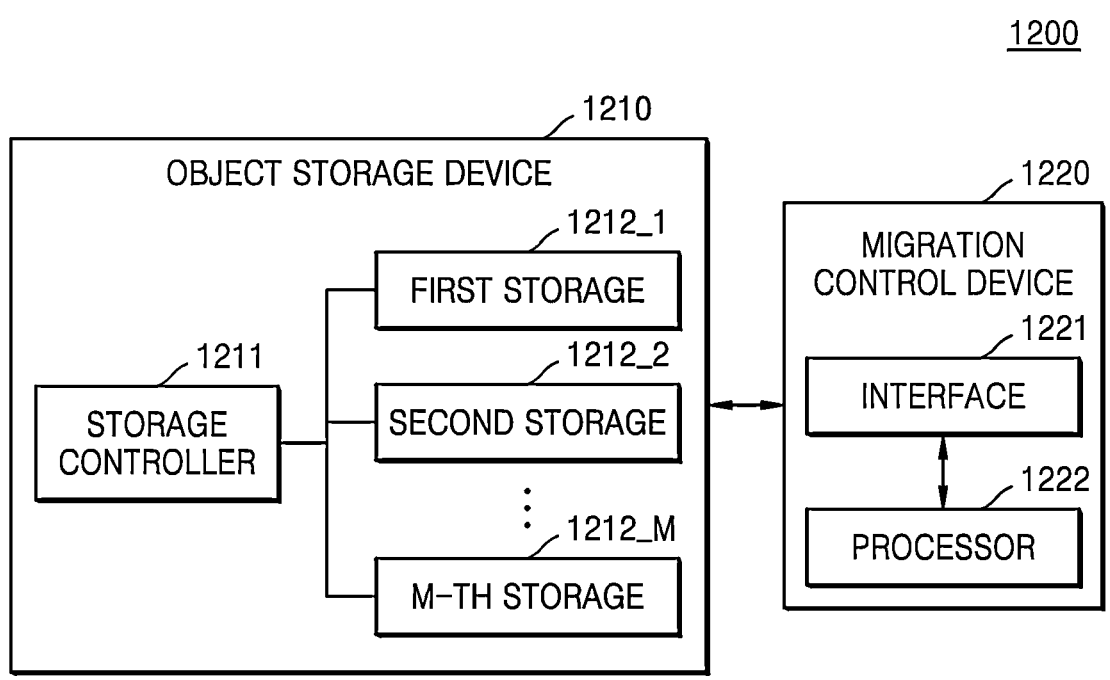
FIG. 12 is a diagram of an object storage system according to at least one embodiment.

FIG. 12 is a diagram of an object storage system according to at least one embodiment.

Referring to FIG. 12, an object storage system 1200 may include an object storage device 1210 and a migration control device 1220.

The object storage device 1210 may include a storage controller 1211 and first to M-th storages 1212_1 to 1212_M. The storage controller 1211 may control the first to M-th storages 1212_1 to 1212_M. The storage controller 1211 may correspond to a hardware device, to which the application model 210 in FIG. 2 is applied and may perform the operations of the application model 210. The first to M-th storages 1212_1 to 1212_M may respectively correspond to storage devices, to which the storage models 220_1 to 220_M are respectively applied, and may perform the operations of the storage models 220_1 to 220_M.

The migration control device 1220 may control the object storage device 1210 to migrate objects stored in the first to M-th storages 1212_1 to 1212_M. For example, the migration control device 1220 may include the first and second neural networks 311 and 312 and the target determiner 313 in FIG. 3. In some embodiments, when the second neural network 312 is integrated with the target determiner 313, the migration control device 1220 may include the first and second neural networks 311 and 312.

In at least one embodiment, the migration control device 1220 may receive, from the object storage device 1210, an information group including the respective first to M-th total target I/O throughputs of the first to M-th storages 1212_1 to 1212_M. Embodiments related to this operation have been described above with reference to FIGS. 2 to 5, 10, and 11. The migration control device 1220 may infer first to M-th reference I/O throughputs, respectively, with respect to the first to M-th total target I/O throughputs. Embodiments related to this operation have been described above with reference to FIGS. 4, 6, 10, and 11. The migration control device 1220 may receive, from the object storage device 1210, the respective first to K-th target I/O throughputs of first to K-th objects stored in an i-th storage device. The i-th storage device may have the i-th total target I/O throughput that is greater than the i-th reference I/O throughput. There may be a plurality of i-th storage devices. Embodiments related to this operation have been described above with reference to FIGS. 7, 8, 10, and 11. The migration control device 1220 may infer the respective first to K-th object points of the first to K-th objects by using the second neural network 312, based on the i-th total target I/O throughput, i-th reference I/O throughput, and first to K-th target I/O throughputs of the i-th storage device. Embodiments related to this operation have been described above with reference to FIGS. 7 and 9 to 11. The migration control device 1220 may determine a target object to be migrated and a target storage device, by using the second neural network 312, based on the information group, the first to M-th reference I/O throughputs, the first to K-th target I/O throughputs, and the first to K-th object points. Embodiments related to this operation have been described above with reference to FIGS. 3, 10, and 11. The migration control device 1220 may transmit to the object storage device 1210, a command instructing to migrate the target object to the target storage device.

In at least one embodiment, the migration control device 1220 may include an interface 1221 and a processor 1222.

The interface 1221 may communicate with the object storage device 1210.

The processor 1222 may include a first neural network and a second neural network. In other words, the migration control application 230 described above with reference to FIG. 2 may be applied to the processor 1222.

While the inventive concepts have been particularly shown and described with reference to embodiments thereof, it will be understood that various changes in form and details may be made therein without departing from the spirit and scope of the following claims.

What is claimed is:

1. A migration control method implemented on a computer for migration of at least one object, the migration control method comprising:
   observing an information group including first to M-th total target input/output (I/O) throughputs of respective first to M-th storage devices, where M is an integer greater than or equal to 2;
   inferring first to M-th reference I/O throughputs with respect to the first to M-th total target I/O throughputs using a first neural network;
   observing first to K-th target I/O throughputs of respective first to K-th objects stored in an i-th storage device, where a total target I/O throughput of the i-th storage device is greater than a reference I/O throughput of the i-th storage device, where "i" is an integer greater than or equal to 1 and less than or equal to M, and K is an integer greater than or equal to 1;
   inferring first to K-th object points of the respective first to K-th objects using a second neural network, based on at least the total target I/O throughput of the i-th storage device, the reference I/O throughput of the i-th storage device, and the first to K-th target I/O throughputs;
   determining a target object to be migrated and a target storage device for the migration using the second neural network, based on at least the information group, the first to M-th reference I/O throughputs, the first to K-th target I/O throughputs, and the first to K-th object points; and
   migrating the target object to the target storage device.

2. The migration control method of claim 1, wherein the information group further includes at least one of first to M-th identifiers of the respective first to M-th storage devices, first to M-th performance tiers of the respective first to M-th storage devices, first to M-th delay times of the respective first to M-th storage devices, first to M-th previous reference I/O throughputs of the respective first to M-th storage devices, or first to M-th average target I/O throughputs of the respective first to M-th storage devices.

3. The migration control method of claim 1, wherein the determining of the target object and the target storage device includes determining, as a first target object, an object corresponding to a largest object point among the first to K-th object points.

4. The migration control method of claim 3, wherein
   the information group further includes first to M-th identifiers of the respective first to M-th storage devices and first to M-th performance tiers of the respective first to M-th storage devices, and
   the determining of the target object and the target storage device includes selecting, as a first target storage device, a storage device, among the first to M-th storage devices, having a different performance tier than the i-th storage device according to a sign of the largest object point, the first target object being stored in the first target storage device.

5. The migration control method of claim 4, wherein the largest object point is a positive number, and
   the determining of the target object and the target storage device includes selecting, as the first target storage device, a storage device having a higher performance tier than the i-th storage device among the first to M-th storage devices.

6. The migration control method of claim 4, wherein the largest object point is a negative number, and
   the determining of the target object and the target storage device includes selecting, as the first target storage device, a storage device having a lower performance tier than the i-th storage device among the first to M-th storage devices.

7. The migration control method of claim 4, wherein a value obtained by subtracting a target I/O throughput corresponding to the largest object point, among the first to K-th target I/O throughputs, from a total target I/O throughput of the first target storage device among the first to M-th total target I/O throughputs is less than or equal to a reference I/O throughput of the first target storage device.

8. The migration control method of claim 3, wherein the inferring of the first to K-th object points and the determining of the target object and the target storage device includes:
  subtracting a target I/O throughput corresponding to the largest object point among the first to K-th target I/O throughputs from the total target I/O throughput of the i-th storage device; and
  determining, as a second target object, an object corresponding to a second largest object point among the first to K-th object points when a result of the subtraction is greater than the reference I/O throughput of the i-th storage device.

9. The migration control method of claim 8, further comprising:
  storing the second target object in a second target storage device,
  wherein the information group further includes first to M-th identifiers of the respective first to M-th storage devices and first to M-th performance tiers of the respective first to M-th storage devices, and
  the inferring of the first to K-th object points and the determining of the target object and the target storage device includes selecting, as the second target storage device, a storage device, among the first to M-th storage devices, having a different performance tier than the i-th storage device, according to a sign of the second largest object point.

10. A migration control device for migrating an object stored in an object storage device, the migration control device comprising:
  an interface configured to communicate with the object storage device; and
  a processor including a first neural network and a second neural network, the processor configured to
    receive an information group, through the interface, the information group including first to M-th total target input/output (I/O) throughputs of respective first to M-th storage devices included in the object storage device, where M is an integer greater than or equal to 2,
    infer first to M-th reference I/O throughputs with respect to the first to M-th total target I/O throughputs using the first neural network,
    receive, through the interface, first to K-th target I/O throughputs of respective first to K-th objects stored in an i-th storage device, where "i" is an integer greater than or equal to 1 and less than or equal to M, and K is an integer that is greater than or equal to 1,
    infer first to K-th object points of the respective first to K-th objects by using the second neural network, based on a total target I/O throughput of the i-th storage device, a reference I/O throughput of the i-th storage device, and the first to K-th target I/O throughputs,
    determine a target object to be migrated and a target storage device for the migration using the second neural network, based on the information group, the first to M-th reference I/O throughputs, the first to K-th target I/O throughputs, and the first to K-th object points, and
    transmit to the object storage device, through the interface, a command instructing to migrate the target object to the target storage device,
  wherein the total target I/O throughput of the i-th storage device is greater than the reference I/O throughput of the i-th storage device.

11. The migration control device of claim 10, wherein the information group includes at least one of first to M-th identifiers of the respective first to M-th storage devices, first to M-th performance tiers of the respective first to M-th storage devices, first to M-th delay times of the respective first to M-th storage devices, first to M-th previous reference I/O throughputs of the respective first to M-th storage devices, or first to M-th average target I/O throughputs of the respective first to M-th storage devices.

12. The migration control device of claim 10, wherein the processor is further configured to determine, as a first target object, an object corresponding to a largest object point among the first to K-th object points.

13. The migration control device of claim 12, wherein
  the information group further includes first to M-th identifiers of the respective first to M-th storage devices and first to M-th performance tiers of the respective first to M-th storage devices,
  the processor is further configured to select, as a first target storage device, a storage device, among the first to M-th storage devices, having a different performance tier than the i-th storage device according to a sign of the largest object point, and
  the command instructs for the first target object to be stored in the first target storage device.

14. The migration control device of claim 12, wherein the processor is further configured to
  subtract a target I/O throughput corresponding to a largest object point, among the first to K-th target I/O throughputs, from the total target I/O throughput of the i-th storage device; and
  determine, as a second target object, an object corresponding to a second largest object point among the first to K-th object points when result of the subtraction is greater than the reference I/O throughput of the i-th storage device.

15. The migration control device of claim 14, wherein
  the information group further includes first to M-th identifiers of the respective first to M-th storage devices and first to M-th performance tiers of the respective first to M-th storage devices, and
  the processor is further configured to
    select, as a second target storage device, a storage device, among the first to M-th storage devices, having a different performance tier than the i-th storage device according to a sign of the second largest object point, and
    transmit to the object storage device, a command instructing to store the second target object in the second target storage device.

16. An object storage system comprising:
  an object storage device including first to M-th storage devices and a storage controller configured to control the first to M-th storage devices, where M is an integer that is greater than or equal to 2; and
  a migration control device including first and second neural networks, the migration control device configured to
    receive an information group from the object storage device, the information group including first to M-th total target input/output (I/O) throughputs of the respective first to M-th storage devices,
    infer first to M-th reference I/O throughputs with respect to the first to M-th total target I/O throughputs using the first neural network,
    receive, from the object storage device, first to K-th target I/O throughputs of respective first to K-th objects stored in an i-th storage device, where "i" is an integer that is greater than or equal to 1 and less than or equal to M, and K is an integer that is greater than or equal to 1, infer first to K-th object points of the respective first to K-th objects using the second neural network, based on a total target I/O throughput of the i-th storage device, a reference I/O throughput of the i-th storage device, and the first to K-th target I/O throughputs, determine a target object to be migrated and a target storage device for migration using the second neural network, based on the information group, the first to M-th reference I/O throughputs, the first to K-th target I/O throughputs, and the first to K-th object points, transmit, to the object storage device, a command instructing to migrate the target object to the target storage device, wherein the total target I/O throughput of the i-th storage device is greater than the reference I/O throughput of the i-th storage device.

17. The object storage system of claim 16, wherein the migration control device is further configured to determine, as a first target object, an object corresponding to a largest object point among the first to K-th object points.

18. The object storage system of claim 17, wherein
the information group further includes first to M-th identifiers of the respective first to M-th storage devices and first to M-th performance tiers of the respective first to M-th storage devices, the migration control device is further configured to
select, as a first target storage device, a storage device, among the first to M-th storage devices, having a different performance tier than the i-th storage device, according to a sign of the largest object point, and the command instructs for the first target object to be stored in the first target storage device.

19. The object storage system of claim 17, wherein the migration control device is further configured to
subtract a target I/O throughput corresponding to a largest object point among the first to K-th target I/O throughputs from the total target I/O throughput of the i-th storage device; and determine, as a second target object, an object corresponding to a second largest object point among the first to K-th object points when a result of the subtraction being greater than the reference I/O throughput of the i-th storage device.

20. The object storage system of claim 19, wherein
the information group further includes first to M-th identifiers of the respective first to M-th storage devices and first to M-th performance tiers of the respective first to M-th storage devices, and the migration control device is further configured to
select, as a second target storage device, a storage device, among the first to M-th storage devices, having a different performance tier than the i-th storage device according to a sign of the second largest object point, and transmit to the object storage device, a command instructing the second target object to be stored in the second target storage device.

\* \* \* \* \*